Nov. 9, 1948.  J. W. TILEY  2,453,645
MICROWAVE POWER MEASURING APPARATUS
Filed Aug. 30, 1944
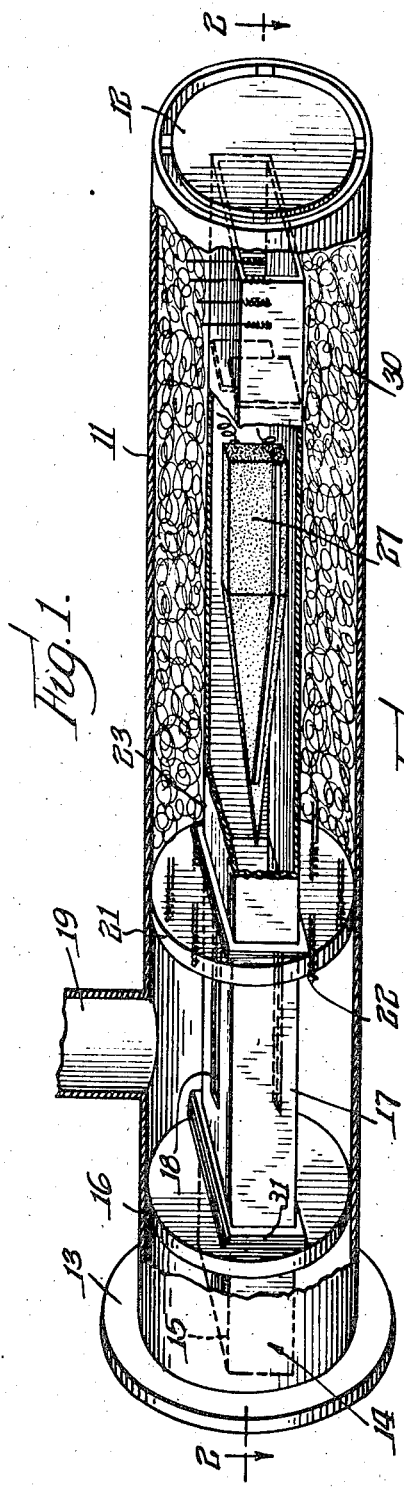
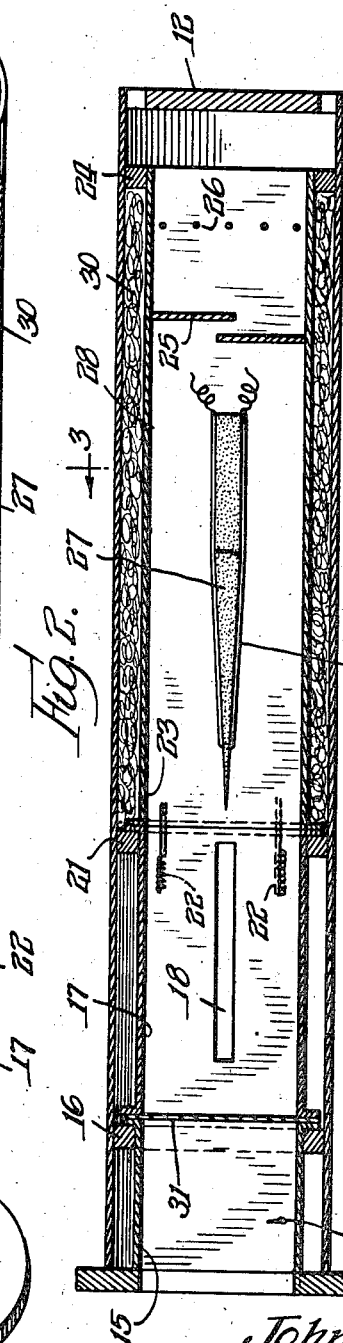
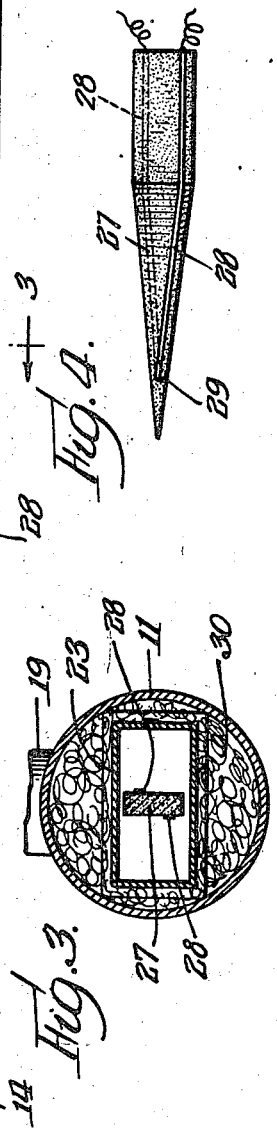
INVENTOR.
John W. Tiley
By:- Howson & Howson
Attys.

Patented Nov. 9, 1948

2,453,645

UNITED STATES PATENT OFFICE 2,453,645

MICROWAVE POWER MEASURING APPARATUS

John W. Tiley, Philadelphia, Pa., assignor to Philco Corporation, Philadelphia, Pa., a corporation of Pennsylvania Application August 30, 1944, Serial No. 551,950

8 Claims. (Cl. 171—95)

The present invention relates to an apparatus for measurement of ultra high frequency energy, and more particularly to such apparatus for use with wave guides.

In the operation of ultra high frequency apparatus it is frequently desired to obtain an indication of the ultra high frequency power being generated or transmitted. In the adjustment and calibration of such apparatus, and in testing ultra high frequency components it is desired to dissipate ultra high frequency energy into a medium from which a reliable indication may be obtained as to total power thus dissipated. In accordance with the present invention there is provided an apparatus including a termination for wave guides so that the apparatus may be connected to a transmission medium such as a wave guide or to an apparatus, and the total power passing the transmission medium or the apparatus may be converted into heat, and the heat may be measured. By a substitution method a similar amount of heat may be generated and the energy used for the generation of such heat gives an indication of the ultra high frequency power.

In accordance with the present invention an apparatus is provided for operation in connection with a wave guide for receiving ultra high frequency energy without substantial reflection back along the wave guide. Substantially all of the ultra high frequency energy received is converted into heat which is dissipated in a fluid medium such as gas or air. Readings are taken of the temperature rise of the air, in obtaining an indication of the power. Such an arrangement obviates certain disadvantages heretofore found in other applications wherein ultra high frequency energy was translated into heat and dissipated in a liquid such as water. Where water is used it is common to use distilled water and to provide an apparatus for circulating and recirculating water. Great care must be taken to prevent air from being introduced into the water so that air bubbles do not collect at certain points in the apparatus so as to give inaccurate readings.

It is, therefore, an object of the present invention to provide an improved apparatus suitable for measuring ultra high frequency power.

It is another object of the present invention to provide an improved apparatus utilizing a wave guide section for connection to wave guides for the measurement of ultra high frequency power transmitted thereby.

Other and further objects of the present invention subsequently will become apparent by reference to the following description taken in connection with the accompanying drawing wherein Figure 1 is a perspective view partially broken away to show certain details of an apparatus embodying the present invention;

Figure 2 is a longitudinal cross section as seen in the direction of the arrows along the line 2—2 of Figure 1;

Figure 3 is a cross sectional view as seen in the direction of the arrows along the line 3—3 of Figure 2; and Figure 4 is a side view of one element of the apparatus shown in the previous figures.

Referring to the drawing there is shown an apparatus having an outer casing 11 provided at one end with a baffle member 12 comprising a disk supported in spaced relation to the inner diameter of the cylindrical housing 11. At the other end the cylindrical housing 11 is connected to a ring or flange 13 which is arranged to cooperate with a ring or flange mounted on the end of a wave guide to which the present apparatus is to be connected. Supported within the cylindrical housing 11 is rectangular wave guide 14 which is formed in a plurality of sections to facilitate the assembly and manufacture of the apparatus. The first section 15 of the wave guide 14 is supported between the flange 13 and an inner insulating ring 16. A mica window 31 separates the section 15 from the succeeding wave guide section 17. The wave guide section 17 is provided with a plurality of longitudinal slots 18 so that air entering through a tube 19 connected to the outer housing 11 may pass through the slots 18 into the interior of the wave guide. The wave guide section 17 is supported by a ring 21 which also supports a plurality of thermopiles 22 for the purpose of measuring the temperature of the air entering the housing 11 from the inlet 19. The succeeding wave guide section 23 is joined to the section 17 and may be provided with suitable support means such as the support 24. The end of the wave guide 23 is open. At a short distance from the open end of the wave guide 23 a plurality of baffle members 25 are provided so that an even distribution of the air is obtained about a plurality of thermopiles 26 which may be suitably supported by an insulating plate on one side of the wave guide. The mica window 31 prevents air from the inlet 19 from going forwardly along the wave guide and causes the air to move through the slot 18 rearwardly through the wave guide. Mounted within the wave guide section 23 is a termination member 27 having a generally pyramidal portion and rectangular solid portion. The apex of the pyramidal portion is pointed toward the front end of the apparatus so that ultra high frequency energy entering into the wave guide section 15 will be received by the inclined surfaces of the member 27 without substantial reflection back along the wave guide. The member 27 is preferably formed of a suitable ceramic containing finely divided particles of material which have a resistance characteristic so as to convert the received ultra high frequency energy into heat. Preferably such ceramic material is formed of clay or steatite mixed with a finely divided resistive material such as colloidally suspended deflocculated graphite, lamp black, silicon carbide or the like. An electric heater 28 is arranged to extend from one side of the member 27 to a position in the proximity of the point of the device and back on the other side. If desired a groove may be formed in the member 27 and the resistance wire for the heater 28 positioned within the groove, although a flat resistance wire may be retained in position by a suitable cement or adhesive on the outer surface of the member 27. In one form the resistance wire element extends along the sides of the termination member 27 and passes through a suitable aperture 29 located in the proximity of the apex of the pyramidal portion of the member.

By a suitable apparatus of conventional structure well known to those skilled in the art, the constant flow of air at a constant pressure is supplied to the pipe 19 while ultra high frequency energy is being supplied to the wave guide 14. Ultra high frequency energy entering the first section 15 of the wave guide 14 readily passes through the relatively thin mica window 31 without loss and continues on until it reaches the inclined surface of the pyramidal portion of the impedance element 27. This element 27 has a high loss characteristic which translates incident ultra high frequency energy into the form of heat. The tapered or inclined surfaces of the member 27 are so arranged that there is substantially no reflection of ultra high frequency energy back along the wave guide 14. The air passing through the inlet pipe 19 flows into the outer cylindrical covering 11 and through the slots 18 in the wave guide section 17 and moves on past the sides of the high loss impedance device 27 past the baffles 25 and out of the end of the wave guide and past the outer baffle member 12 at the end of the outer cylindrical covering 11. The thermopiles 22 give an indication of the temperature of the incoming air, and the thermopiles 26 give an indication of the temperature of the outgoing air. The heat generated by the device 27 due to the incident energy is dissipated into air.

The space between the walls of the wave guide section 23 and the outer cylindrical covering 11 between the mounting rings 21 and 24 is filled with a heat insulation material 30, such as rock wool, so that the thermocouples 26 respond to all of the heat energy produced by the impedance element. The insulation material therefore speeds up the operation of the device and increases its accuracy. The baffle 12 at the end of the outer cylindrical housing 11 prevents air from the room from entering into the housing and the open end of the wave guide section 23. Thus the thermopiles 26 are protected against the influence of ambient conditions which otherwise might reduce the accuracy of the results obtained from the apparatus.

Subsequently while maintaining the flow of air in the inlet 19 at the same rate and pressure the ultra high frequency energy is cut off, and sixty cycle alternating current power is supplied to the heater 28 to bring the temperature of the device 27 up to its former temperature so that the thermopiles 26 will give the same temperature as previously. When such condition has been obtained and maintained the amount of power supplied to the heater 28 may be read directly from a watt meter. This reading corresponds to the average ultra high frequency power dissipated. If an indication is desired other than the average ultra high frequency power, the watt meter may be calibrated to read peak radio frequency power on pulse modulation (for a given radio frequency duty cycle), or average radio frequency voltage (for a given characteristic impedance of the wave guide), or peak radio frequency voltage (for a given radio frequency duty cycle and characteristic impedance of the wave guide). Thus it will be appreciated that a relatively simple convenient to use apparatus has been provided for simplifying the substitution method for measuring ultra high frequency power. Where other conditions are maintained constant and only the power varies, the temperature readings obtained from the thermopiles 22 and 26 may be directly interpreted in terms of power dissipated based upon previous calibration records.

In the drawing no supporting means has been shown for the ceramic impedance member 27, but it will be understood by those skilled in the art that the member may be retained in position in any suitable manner as for example by the use of mica support members. The impedance member 27 may be made from a ceramic material having a five to ten per cent content of carbon and commonly a rectangular piece is cut from a slab or sheet of one-eighth or three sixteenths of an inch thickness. This rectangular body may be cut from the material by a hacksaw and then ground or filed to appropriate dimensions having a configuration generally such as that appearing in the drawing. A small hole is drilled through the ceramic at a point adjacent its apex so that a nichrome resistance wire of Number 35 or Number 40 size and of twenty-five ohms resistance may be secured in position on the ceramic member. The ends of the resistance wire are wound upon bare copper wire and soldered or welded thereto. Where slots are formed in the member it has been found convenient to fill the slots with white porcelain cement and then imbed the wire in the soft cement. When the impedance element has been completed it is suitably mounted by support members such as those made of insulating material or mica sheets in the wave guide portion 23. The wave guide portion 23 thereupon is connected between two slotted wave guide portions, the forward one of which is connected to a source of ultra high frequency operating within the range in which the completed assembled device is to be used for measurements. Suitable hand probes and bolometers are used to check the energy within the wave guide sections in front of and in back of the section 23. A standing wave ratio in the forward slotted guide section of 1.06 or better is deemed to be satisfactory. No appreciable or readable amount of energy should be indicated by the bolometer in the rear slotted wave guide. Such test then indicates that no appreciable energy is being reflected back along the wave guide and also that no appreciable energy is being transmitted past the impedance element. This test then clearly shows that all of the incident energy is being absorbed and is being converted into heat.

The alternating current heater may be tested by applying approximately thirty-five watts of energy for one half hour to the element during which observation is made to see that no hot spots develop along the heater element wire. Hot spots may occur due to uneven cementing of the wire in position either in the groove or on the surface of the ceramic impedance member 27. If hot spots are observed a new resistance element is secured in position.

After the impedance element as mounted in the section 23 of the wave guide has been satisfactorily tested the mica window 31 is cemented in position with a minimum amount of cement such as polystyrene cement. The window may be tested by the application of ultra high frequency for a period such as fifteen minutes with no air being supplied to the apparatus. If no heat is developed on the window no losses are taking place. If losses do occur another piece of mica or possibly a thinner piece of mica is used since the sole purpose of the mica is to prevent the air from moving forwardly along the wave guide. While in the description of the device it has been stated that the impedance element 27 preferably has tapered or inclined surfaces arranged so that there is substantially no reflection of ultra high frequency energy back along the wave guide 14, and preferably a certain standing wave ratio is obtained, the device may be used under conditions where the impedance match is less complete. Where the device is used with an imperfect impedance match, the results obtained from the readings of the thermopiles are used in calculations predicted upon the known effects of the imperfect impedance match, and hence it is possible even under such conditions to obtain an accurate indication of the ultra high frequency power being transmitted or generated.

While for purposes of illustrating and describing the present invention a certain embodiment has been shown in the drawing it is to be understood that the invention is not to be limited thereby since such variations in the arrangement of the components and in their dimensions and configurations are contemplated as may be commensurate with the spirit and scope of the invention as defined in the appended claims.

This invention is hereby claimed as follows:

1. A device for the measurement of ultra high frequency power comprising a wave guide, an impedance device mounted within said wave guide and arranged so as to produce substantially no reflection of energy, said impedance device comprising a body composed of a material capable of dissipating the energy entering said body, a casing surrounding said wave guide, means for supplying to said casing a flow of air under constant conditions, means for preventing the flow of air forwardly along said wave guide, slotted apertures provided in the walls of said wave guide for permitting said air to enter therein and to move rearwardly along the wave guide past said impedance element, and thermopile means responsive to the temperature of the air before and after passing said impedance element.

2. A device for the measurement of ultra high frequency power comprising a wave guide having adjacent one end a fluid impervious partition, a plurality of slots arranged in the walls of said wave guide beyond said partition, a casing surrounding said wave guide, an impedance element mounted within said wave guide and arranged to produce substantially no reflection of energy, said impedance element being composed of a ceramic material containing finely divided substance for converting energy entering said impedance element into heat, means for supplying air to said casing in the proximity of the slotted portion of said wave guide, baffle means arranged within said wave guide adjacent one end thereof, thermopile means located adjacent said baffle means, thermopile means located so as to respond to the temperature of the air entering through the slots of said wave guide, and baffle means mounted at the end of said casing adjacent the end of said wave guide.

3. A device for measuring ultra high frequency energy by the substitution method comprising a wave guide, a ceramic body having a high loss characteristic capable of converting received ultra high frequency energy into heat, said ceramic body having inclined surfaces arranged so as to prevent reflection of ultra high frequency energy back along said wave guide, a plurality of slots arranged in the walls of said wave guide to permit air under constant conditions to enter said wave guide, a window located adjacent one end of said wave guide for forcing said air to move in one direction along said wave guide, thermo-electrical means responsive to the temperature of the air entering said wave guide, thermo-electrical means responsive to the temperature of the air leaving said wave guide, said latter means being mounted within said wave guide, and baffle means mounted within said wave guide at the rear of said ceramic body to insure even distribution of air through said wave guide.

4. A device for measuring ultra high frequency energy by the substitution method comprising a wave guide, a ceramic body having a high loss characteristic capable of converting received ultra high frequency energy into heat, said ceramic body having inclined surfaces arranged so as to prevent reflection of ultra high frequency energy back along said wave guide, a plurality of slots arranged in the walls of said wave guide to permit air under constant conditions to enter said wave guide, a window located adjacent one end of said wave guide for forcing said air to move in one direction along said wave guide, thermo-electrical means responsive to the temperature of the air entering said wave guide, thermo-electrical means responsive to the temperature of the air leaving said wave guide, said latter means being mounted within said wave guide, and an electrical heating element mounted on said ceramic body for heating said body to a temperature comparable to the temperature resulting from the conversion of ultra high frequency energy into heat.

5. A device for the measurement of ultra high frequency power comprising a wave guide section having mounted therein a ceramic termination device, said ceramic termination device being composed of a material for converting incident ultra high frequency energy into heat and having the characteristic of exhibiting small change due to temperature variation, said ceramic termination device having such configuration as to produce substantially no reflection of ultra high frequency energy back along said wave guide, an electric heater mounted on said termination device for producing a temperature corresponding to the temperature produced by conversion of ultra high frequency energy, a housing for said wave guide to reduce the effects of ambient variations, means for supplying to said housing air under constant conditions, a plurality of slots arranged in the walls of said wave guide to permit the air introduced into said housing to pass into said wave guide, a mica window mounted adjacent one end of said wave guide to cause said air to move in one direction within said wave guide, thermopile means arranged to respond to the temperature of the air before and after said air passes said ceramic impedance device, and baffle means mounted adjacent one end of said housing.

6. A device for the measurement of ultra high frequency power by the substitution method comprising a rectangular wave guide section, a housing for said wave guide section to reduce the effects of ambient variations, a window for one end of said wave guide to permit the passage of ultra high frequency energy without substantial loss and to prevent the passage of a fluid medium past said window, an impedance device mounted within said wave guide, said impedance device having a portion pyramidal in form so as to prevent reflection of incident ultra high frequency energy, said impedance device being formed of a ceramic material containing finely divided particles so that the device will convert ultra high frequency energy entering therein into heat, means for supplying fluid medium such as air under constant conditions to said housing adjacent the window of said wave guide, a plurality of slots located in the walls of said wave guide adjacent said window to permit air from said housing to enter into said wave guide and to pass said impedance device, a plurality of thermopiles located adjacent said slots to respond to the temperature of the air entering said wave guide, a plurality of baffle members mounted within said wave guide in back of said impedance device to insure even distribution of fluid medium about said device, a plurality of thermopiles mounted within said wave guide between said baffle members and the end of said wave guide, baffle means mounted adjacent the end of said housing to permit the escape of air therefrom, and electrical heating means mounted on said impedance device for heating said device to a temperature comparable to the temperature generated by the conversion of incident ultra high frequency energy into heat.

7. A device for the measurement of ultra high frequency power by the substitution method comprising a rectangular wave guide section having adjacent one end thereof a mica window, a plurality of slots arranged in the walls of said wave guide adjacent said mica window, a ceramic impedance device positioned within said wave guide beyond said slots, said ceramic impedance device being formed of a material for converting ultra high frequency energy into heat, said device having such configuration as to prevent substantial reflection of ultra high frequency energy back along said wave guide, an electrical heating element mounted for heating said impedance device, a housing for said wave guide for supporting said guide in spaced relation to said housing, said housing being formed of a material having a low heat conductivity characteristic so as to reduce the effects of ambient temperature, means positioned adjacent the slots in said wave guide for introducing air under constant conditions to said housing and to said wave guide, thermopile means arranged to respond to the temperature of the air entering said wave guide, baffle means mounted within said wave guide to insure even distribution of air about said impedance device, thermopile means mounted between said baffle means and the end of said wave guide so as to be responsive to the temperature rise of the air passing over said impedance device, and baffle means positioned adjacent the end of said housing to permit the escape of air therefrom.

8. A device for the measurement of ultra high frequency power comprising a rectangular wave guide section having adjacent one end thereof a mica window, a plurality of openings in the walls of said wave guide adjacent said mica window, a ceramic impedance device positioned within said wave guide beyond said openings, said ceramic impedance device being formed of a material capable of converting ultra high frequency energy into heat, an electrical heating element mounted for heating said impedance device, a housing for said wave guide for supporting said guide in spaced relation thereto, said housing being formed of a material having a low heat conductivity characteristic so as to reduce the effects of ambient temperature, heat insulation means positioned between said wave guide and said housing in the proximity of the location of said ceramic impedance device, means positioned adjacent the openings in said wave guide for introducing air under constant conditions to said housing and to said wave guide, thermopile means arranged to respond to the temperature of the air entering and leaving said wave guide, and baffle means positioned adjacent the end of said housing to prevent stray room air currents from entering said housing and the end of said wave guide thereby to minimize the effects of ambient conditions on said thermopile means.

JOHN W. TILEY.

REFERENCES CITED

The following references are of record in the file of this patent:

UNITED STATES PATENTS

| Number | Name | Date |
| --- | --- | --- |
| 1,866,611 | Affel | July 12, 1932 |
| 1,957,454 | Gebhard | May 8, 1934 |
| 2,262,134 | Brown | Nov. 11, 1941 |
| 2,273,547 | Radinger | Feb. 17, 1942 |
| 2,294,881 | Alford | Sept. 8, 1942 |
| 2,387,158 | Kozanowski | Oct. 16, 1945 |
| 2,398,606 | Wang | Apr. 16, 1946 |